United States Patent [19]

Berkman

[11] Patent Number: 4,782,949

[45] Date of Patent: Nov. 8, 1988

[54] STORAGE MODULE FOR MIXED-SIZE MAGNETIC TAPE RECEPTACLES

[75] Inventor: Joseph L. Berkman, Mamaroneck, N.Y.

[73] Assignee: Berkman Industries, Inc., Boynton Beach, Fla.

[21] Appl. No.: 95,531

[22] Filed: Sep. 10, 1987

[51] Int. Cl.[4] .................. B65D 85/672; B65D 1/36
[52] U.S. Cl. .................... 206/387; 206/564; 220/22; 312/9; 312/10; 312/350
[58] Field of Search .............. 206/387, 564, 561, 444, 206/493; 220/22; 211/40; 312/350, 10, 11, 12, 8, 9

[56] References Cited

U.S. PATENT DOCUMENTS

| 3,756,383 | 9/1973 | Kryter | 206/387 X |
| 4,117,931 | 10/1978 | Berkman | 206/387 |
| 4,231,473 | 11/1980 | Aprahamian | 206/387 |
| 4,293,075 | 10/1981 | Veralrud | 211/40 |
| 4,411,481 | 10/1983 | Berkman | 312/8 |
| 4,432,453 | 2/1984 | Berkman | 206/387 |
| 4,440,458 | 4/1984 | Berkman | 312/9 |
| 4,705,169 | 11/1987 | Mastronardo | 206/387 |
| 4,707,247 | 11/1987 | Savoy | 206/387 |

OTHER PUBLICATIONS

Photograph of device manufactured by Merzon Co., Elmhurst, Queens, New York.

*Primary Examiner*—Stephen Marcus
*Assistant Examiner*—Bryon Gehman
*Attorney, Agent, or Firm*—Lackenbach, Siegel, Marzullo & Aronson

[57] ABSTRACT

A storage module for magnetic tape cassettes and cassette boxes of various dimensions comprises a plurality of parallel storage compartments, each having a bottom and side walls. The side walls have a horizontal, divided, lower support surface defining two parallel storage zones per compartment for unboxed cassettes and horizontal, upper support surfaces for supporting a boxed cassette. A digital audio tape cassette fits firmly into the bottom of each compartment between the lower support surfaces.

19 Claims, 2 Drawing Sheets

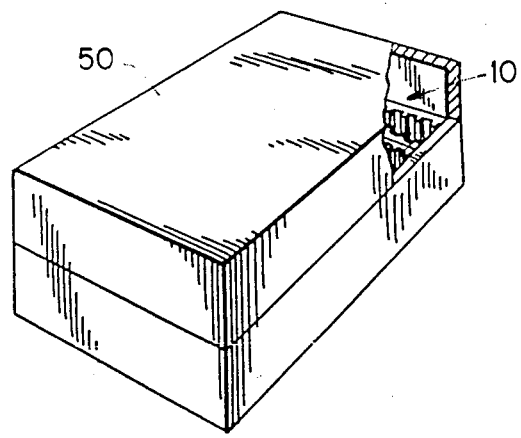
FIG.1
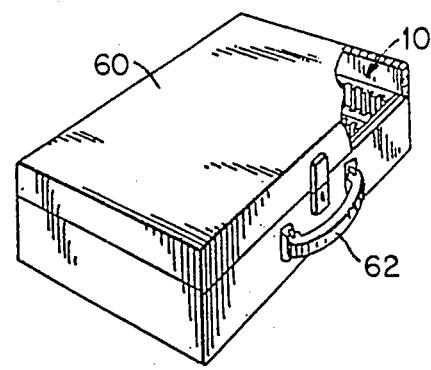
FIG.2
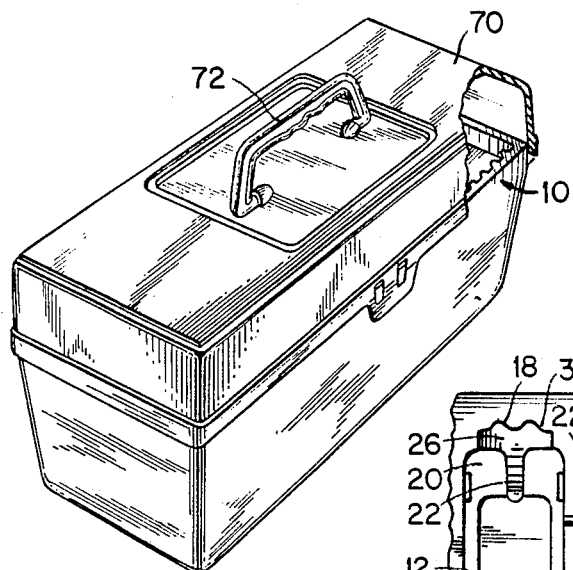
FIG.3
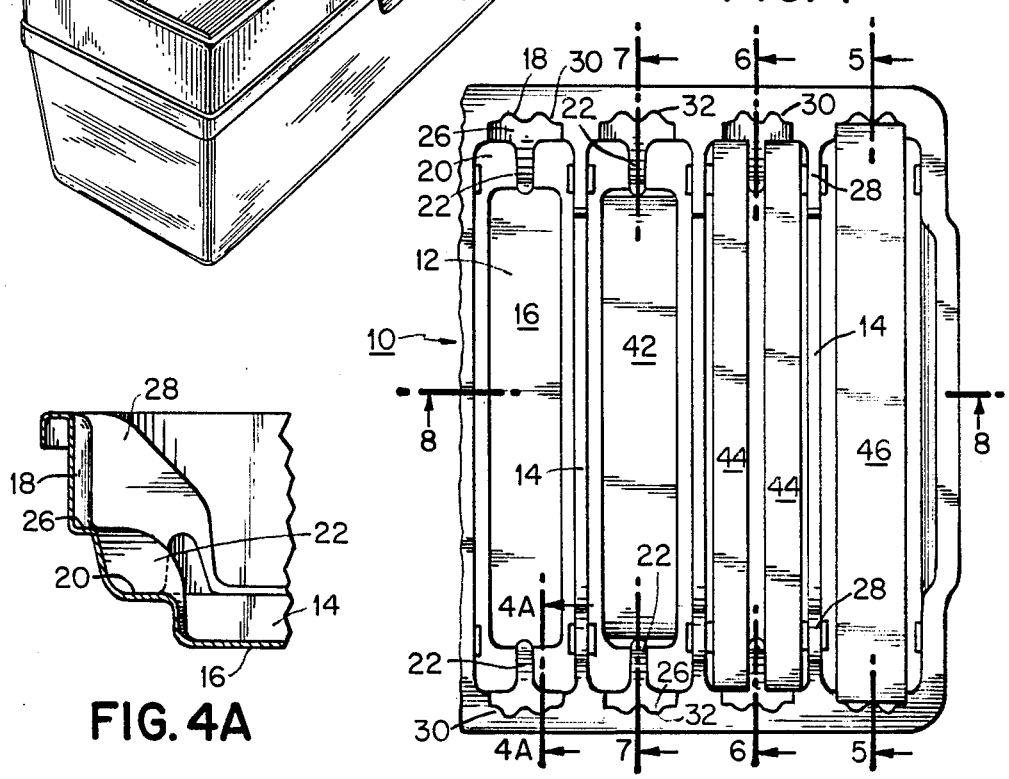
FIG.4
FIG.4A

STORAGE MODULE FOR MIXED-SIZE MAGNETIC TAPE RECEPTACLES

FIELD OF THE INVENTION

This invention relates to the interchangeable storage of magnetic tape cassettes of different sizes and forms. More specifically, it deals with the storage of digital audio tape cassettes, unboxed magnetic tape cassettes, and boxed magnetic tape cassettes.

BACKGROUND OF THE INVENTION

The growth of the magnetic tape recording industry in several directions has generated several different types and sizes of magnetic tapes, hence storage cases with various configurations. Whether a storage device for magnetic tapes appears in the form of a tray, a box, an attache case, a cabinet, or any other structure, it is convenient to produce a modular insert which alone, or as part of another structure, can hold various types and sizes of magnetic tapes.

My previous design and utility patents disclose a variety of such carrying cases and storage cabinets, as do the references cited therein:

| | | | |
|---|---|---|---|
| Des. | 230,527 | Des. | 249,823 |
| Des. | 230,528 | | 4,117,931 |
| | 3,889,817 | Des. | 257,496 |
| Des. | 237,338 | Des. | 264,771 |
| | 4,003,468 | | 4,411,481 |
| Des. | 249,590 | | 4,432,453 |
| Des | 249,743 | | 4,440,458 |
| | | | 4,518,084 |

Especially do FIGS. 1,2,3 of U.S. Pat. No. 4,411,481 and FIG. 3 of U.S. Pat. No. 4,440,458 show storage modules for a variety of different kinds of magnetic tape cassettes in different sizes.

My previous patents disclose storage modules having a row of compartments in which one boxed or two unboxed cassettes may be interchangeably stored in each compartment of the row. The design and organization of the storage module is based on the individual compartment.

U.S. Pat. No. 3,756,383 discloses a different concept from mine in that the interchangeability of boxed and unboxed cassettes is based on the row of compartments, not on each compartment. That is the storage supports for boxed and unboxed cassettes are "out of phase", so that the ratio is not 2 for 1 unboxed/boxed as in my disclosures.

A picture of a plastic module of unknown origin has been deposited as an exhibit in the file of this patent. This picture shows an "out of phase" arrangement of compartments, wherein a small size video game cartridge may be stored inside the three-sided interior zone in the bottom well of each compartment, a large video game cartridge may be stored inside a compartment well resting on top of the three-sided structures, and yet a larger video game cartridge may be stored on top of the entire storage well resting on a side support shelf which also bears vertical supports "out of phase" with the storage well. That is, the spacing of the vertical supports does not coincide regularly with the spacing of the sunken compartments.

U.S. Pat. No. 3,710,900 discloses a carrying case for a plurality of modules each sized to hold different size tape cassettes, wherein the modules are interchangeable, but the compartments in each module are designed to hold only one size of tape cartridge or cassette.

U.S. Pat. No. 3,736,036 shows a storage module for holding either boxed or unboxed cassettes in the same space, but the module is constructed so that boxed cassettes are stored in one direction and unboxed cassettes in the perpendicular direction. Thus a module may hold either all boxed or all unboxed cassettes, but not an interchangeable mixture at the individual level.

U.S. Pat. No. 3,907,116 discloses a storage rack for boxed or unboxed cassettes interchangeable in each compartment by means of separators with nesting recesses, so that boxed cassettes fit between the separators, and unboxed cassettes are held in the nesting recesses by the gripping protrusion found on standard magnetic tape cassettes.

U.S. Pat. No. 4,303,159 shows a compartment for holding a larger VHS videocassette, which when fitted with a removable L-shaped insert, is sized to hold the smaller Beta-type videocassette.

OBJECTS OF THE INVENTION

It is an object of the present invention to provide a storage module for magnetic tape cassettes, boxes, and cartridges which will interchangeably handle three different sizes of such.

It is a further object of the instant invention to disclose a storage module for three different sized tape cassettes, boxes, or cartridges which can be fabricated in a lightweight, strong, simple design, which is easy and inexpensive to produce.

It is yet a further object to provide a storage module for three different sizes of tape cassettes, boxes, or cartridges which is useful by itself, can be produced as a tray, can be used as an insert in an attache case, can be made part of a drawer in a cabinet, can be employed by itself in a portable carrying case, as part of an item of furniture in the home, or be installed in an automobile.

It is still another object to provide a storage module which itself can be any size and which can be employed with other similar modules to make a storage installation of any size and number.

It is another object to provide a storage module for three sizes of tape cassettes, cartridges, or boxes which can be made of plastics, wood, metal, ceramics, composites, or any of a wide variety of materials.

SUMMARY OF THE INVENTION

An improved storage module in accordance with the invention for magnetic tape cassettes and magnetic tape cassette boxes of various dimensions comprises at least one row of a plurality of parallel storage compartments, each compartment defined by a bottom surface and two opposing side walls, at least one side wall of each compartment having at least one horizontal, equally divided, interior, lower, support surface defining two parallel storage zones per compartment and at least one, horizontal, undivided, interior upper support surface, said lower suport surface for each compartment being extended further from the side wall than said upper support surface, the divided lower support surface being elevated above the bottom surface and the upper support surface being further elevated above the bottom surface, whereby digital audio tape cassettes fit firmly and interchangeably onto the bottom of each compartment cradled inside the lower support surface. Each unboxed cassette fits firmly into a zone defining one-half of the divided lower support surface. Cassette boxes fit firmly into each compartment resting on the upper support surface and on top of the dividers for the lower support surface.

Preferably, the parallel compartments are separated from each other by dividing means, which preferably project up from the bottom continuous from side wall to side wall.

Preferably, the side walls are corrugated, are divided by upper dividers integral with the compartment dividers, and have strengthening corner ribs.

Preferably there are upper and lower support surfaces on both sides of each compartment with the dividers for the lower support surface integral with the upper support surface.

The storage module described above is useful as it is, may be part of a tray, may be an insert in an attache case or a sport bag, may be an insert in a cabinet, or may be installed in an automobile.

BRIEF DESCRIPTION OF THE DRAWINGS

The present invention is now described with reference to the drawings, wherein

FIG. 1 is a perspective view of a storage module as part of a cabinet.

FIG. 2 is a perspective view of a storage module as an insert in an attache case.

FIG. 3 is a perspective view of a storage module as an insert in a portable box.

FIG. 4 is a plan view of a storage module with four compartments, one being empty, one containing a digitial audio tape, containing two unboxed cassettes, and one containing a boxed cassette.

FIG. 4A is a cross-sectional view taken along line 4A—4A of FIG. 4.

DESCRIPTION OF THE PREFERRED EMBODIMENTS

Figure 5:
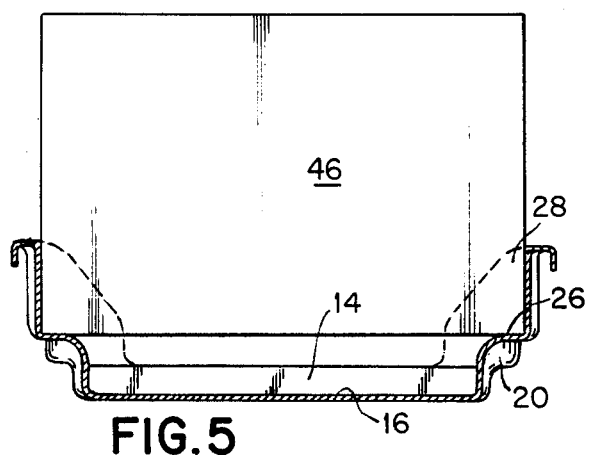
FIG. 5 is a cross-sectional view taken along line 5—5 of FIG. 4.

Referring now to FIGS. 4-8 the storage module generally indicated as 10 may be employed alone or as an insert in a cabinet, an attaché case, a sport bag, a carrying box, or fitted in an automobile. The storage module 10 contains at least one row preferably, but not necessarily, of identical compartments 12, which preferably, but not necessarily, are separated from each other by dividers 14. In FIG. 4 dividers 14 are shown as continuous, but this is not necessary, as the dividing means may be discontinuous. Each compartment 12 has a bottom 16 and side walls 18. The bottom 16 of a compartment is proportioned to releasably hold a digital audio tape 42. At least one side wall 18 is provided with a horizontal lower support surface 20, which is divided equally by wall divider 22 into two equal storage zones 24, which may each hold an unboxed cassette 44 interchangeably. Preferably wall divider 22 is structurally integral with bottom 16, side wall 18, horizontal lower support surface 20, and a horizontal upper support surface 26. Lower horizontal divided support surface 20 extends farther away from side wall 18 than does upper horizontal support surface 26. Preferably each compartment has two upper horizontal support surfaces 26, but the invention is operable with only one. Upper support surface 26 is sized to receive a boxed cassette 46.

The structure of the storage module is preferably strengthened along the upper side walls by vertical dividers 28 in the shape of a right triangle integral with compartmental dividers 14. Preferably the structure is even further strengthened by corner vertical ribs 30 and corrugated side walls 32.

Figure 9:
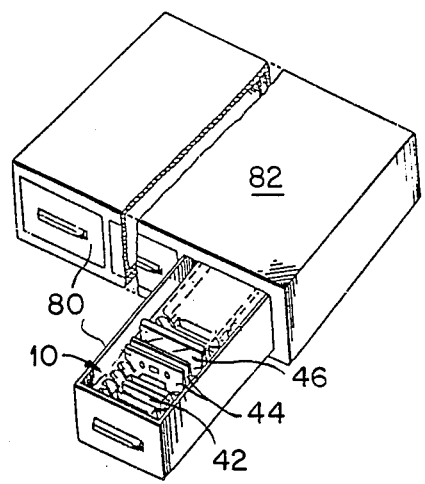
FIG. 9 is a perspective view of a cabinet containing a storage module holding three different sizes of tape cassettes and boxes.
Figure 6:
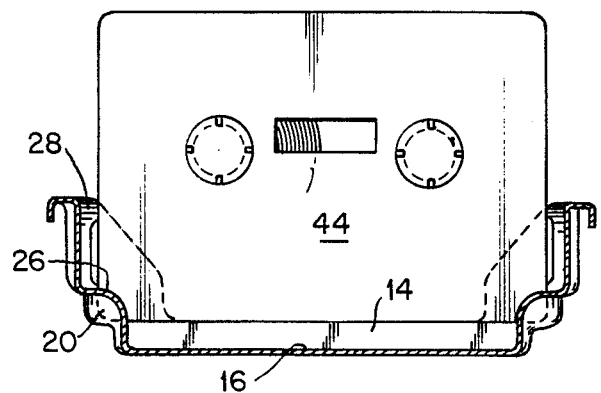
FIG. 6 is a cross-sectional view taken along line 6—6 of FIG. 4.
Figure 7:
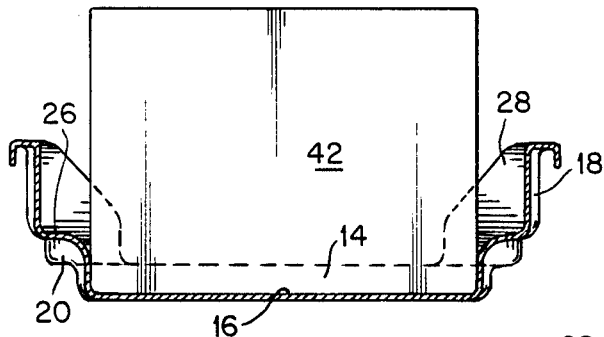
FIG. 7 is a cross-sectional view taken along line 7—7 of FIG. 4.
Figure 8:
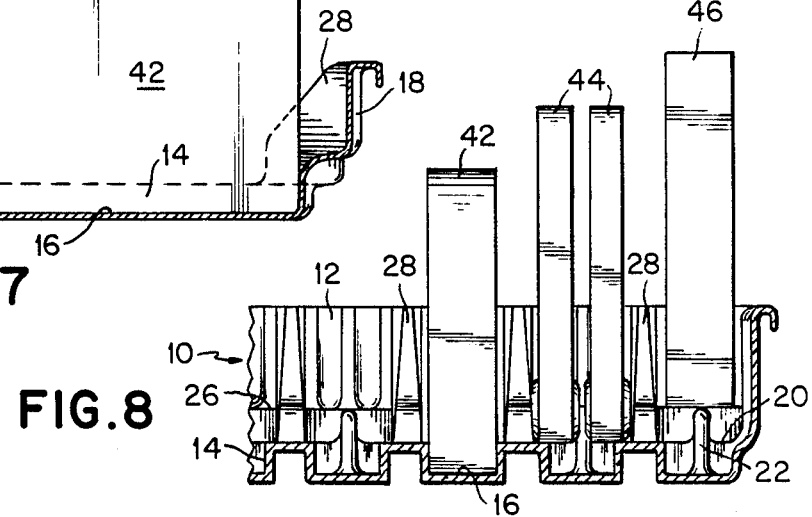
FIG. 8 is a cross-sectional view taken along line 8—8 of FIG. 4.

FIG. 1 shows a storage module 10 as an insert in box 50. FIG. 2 shows a storage module 10 installed in a hinged attache case 60 with a handle 62. FIG. 3 shows a storage module 10 contained in a portable box 70 with a carrying handle 72. FIG. 9 shows a storage module 10 in a drawer 80 of a file box or cabinet 82. Other containers of storage modules are also possible within the scope of the present invention.

The storage module as a tray, alone, or as an insert or integral part of a box, cabinet, valise, portable box, and the containers themselves, may be fabricated suitably from a wide assortment of materials including, but not limited to wood, metal, cardboard, paper, paper mache, ceramic, leather, plastics, molded or vacuum formed in a wide array of designs and shapes of cabinets and carrying cases.

Basic storage modules may be arranged in series, or parallel, or mixtures of both. In all cases it is the essence of the present invention that the storage modules firmly hold interchangeably magnetic tape cassettes, digital audio tapes, and tape cassette boxes of three different sets of dimensions with the dimensions of the storage module selected accordingly.

The construction may be of rigid material or have a degree of resiliency. With such resilient material the module can be dimensioned to provide a slight press fit for the cassettes in the compartments. For example, the cassette 42 (FIG. 4) is gently wedged between the opposed dividers 22.

While several embodiments of the present invention have been described in detail by way of example, it is understood that various changes and modifications may be made in the relative dimensions, size, form, details, arrangement, and embellishment of the parts and still be within the scope of Letters Patent which are sought as set forth in the following claims.

I claim:

1. A storage module for magnetic tape cassettes and magnetic tape cassette boxes of various dimensions comprising:

at least one row of a plurality of parallel storage compartments, each compartment defined by a bottom surface and two opposing side walls, at least one said side wall of each compartment having at least one horizontal interior lower support surface spaced from and parallel to said bottom surface, and at least one wall divider dividing at least one lower support surface to define two parallel storage zones per compartment, and at least one horizontal undivided interior upper support surface spaced from and parallel to said bottom surface, said lower support surface for each compartment extending further from the side wall than said upper support surface, the bottom of each compartment being dimensioned to receive with a close fit a digital audio tape cassette, each said zone of the divided lower support surface being dimensioned to receive an unboxed cassette with a close fit, said upper support surface being dimensioned and spaced apart from the opposing side wall to receive a cassette box with a firm fit.

2. A storage module as in claim 1, wherein each parallel compartment is separated from its vicinal compartment by dividing means.

3. A storage module as in claim 2, wherein said dividing means projects up from the bottom surface of the module.

4. A storage module as in claim 2, wherein the dividing means is discontinuous from side wall to side wall.

5. A storage module as in claim 2, wherein the dividing means between compartments are continuous from side wall to side wall.

6. A storage module as in claim 1, wherein the side walls bear vertical dividers between compartments.

7. A storage module as in claim 6, wherein the dividing means between compartments are integral with side wall dividers from the bottom of the module to the top of the side walls.

8. A storage module as in claim 1, wherein the divider for the lower support surface is integral with the upper side wall support.

9. A storage module as in claim 1, wherein both side walls for each compartment have lower horizontal support surfaces.

10. A storage module as in claim 1, wherein both side walls for each compartment have upper horizontal support surfaces.

11. A storage module as in claim 1, wherein the interior corners of each compartment above the upper horizontal support surfaces have vertical ribs.

12. A storage module as in claim 1, wherein the side walls are corrgated.

13. A storage module as in claim 1, installed as an insert in an attache case with a hinged cover.

14. A storage module as in claim 1, installed as an insert in a storage cabinet.

15. A storage module as in claim 1, wherein the module is integrally formed into a case.

16. A storage module as in claim 1, wherein the module is in the form of a tray for use alone for storing digital audio tape cassettes, unboxed cassettes, cassette boxes, or any desired combination thereof.

17. A storage module as in claim 1, wherein said wall divider rises from said bottom surface to the level of said upper support surface.

18. A storage module as in claim 1, wherein said divided lower support surface is elevated above said bottom surface, and said upper support surface is further elevated above said bottom surface.

19. A storage module as in claim 1, wherein said module is constructed of a resilient material, said compartments being dimensioned to provide for a slight press fit of said cassettes.

* * * * *